US009969214B1

(12) United States Patent
Gesto (10) Patent No.: US 9,969,214 B1
(45) Date of Patent: May 15, 2018

(54) WHEEL REMOVAL DEVICES (71) Applicant: Pro-Tote Systems, Inc., South Bend, IN (US)

(72) Inventor: James Gesto, South Bend, IN (US)

(73) Assignee: Pro-Tate Systems, Inc., South Bend, IN (US)

( * ) Notice: Subject to any disclaimer, the term of this patent is extended or adjusted under 35 U.S.C. 154(b) by 0 days. days.

(21) Appl. No.: 15/657,692

(22) Filed: Jul. 24, 2017

(51) Int. Cl.
*B25B 27/02* (2006.01)
*B60B 29/00* (2006.01)
*B25B 27/06* (2006.01)

(52) U.S. Cl.
CPC .......... *B60B 29/008* (2013.01); *B25B 27/023* (2013.01); *B25B 27/062* (2013.01); *B60B 2900/212* (2013.01); *Y10T 29/49822* (2015.01); *Y10T 29/5387* (2015.01); *Y10T 29/53861* (2015.01)

(58) Field of Classification Search
CPC . B60B 29/008; B60B 29/00; B60B 2900/212; B25B 27/023; B25B 27/062; B25B 27/00; B25B 27/0035; Y10T 29/53861; Y10T 29/53865; Y10T 29/5387; Y10T 29/53874; Y10T 29/49822; Y10T 29/53843; Y10T 29/53848
USPC ......... 29/259, 261, 262, 244, 245, 256, 257, 29/246.5, 426.5
See application file for complete search history.

(56) References Cited

U.S. PATENT DOCUMENTS

| 1,123,513 | A | * | 1/1915 | Gaillard | B25B 27/023 29/261 |
| 1,258,699 | A | * | 3/1918 | Neumaier | B25B 27/023 29/259 |
| 1,310,447 | A | * | 7/1919 | Schilling | B25B 27/023 29/259 |
| 1,347,809 | A | * | 7/1920 | Frisz | B25B 27/023 29/259 |
| 1,383,382 | A | * | 7/1921 | Brockway | B25B 27/023 29/260 |
| 1,402,477 | A | * | 1/1922 | Carradus | B25B 27/023 29/261 |
| 3,372,457 | A | * | 3/1968 | Selby | B25B 27/023 29/259 |
| 3,571,887 | A | * | 3/1971 | McIntire | B60B 29/008 29/256 |

(Continued)

FOREIGN PATENT DOCUMENTS

| DE | 3515657 | 11/1985 |
| GB | 200880 | 7/1923 |
| GB | 952759 | * 10/1961 |

*Primary Examiner* — Christopher M Koehler
*Assistant Examiner* — Mahdi H Nejad
(74) *Attorney, Agent, or Firm* — Beem Patent Law Firm (57) ABSTRACT

Improved wheel removal tools may include a frame, one or more removal members movably coupled to the frame and one or more connection members coupled to a respective removal member. In operation, the frame may be attached to the wheel, such as at one or more wheel studs or bolts, and the connection members may be attached to the wheel, such as by engaging apertures in the wheel. The base may be configured to leverage the wheel studs—rather than the axle hub—during the wheel removal process. Once engaged with the wheel, the removal members may be moved away from the wheel by an operator so that the connection members pull the wheel to dislodge the seized wheel from the vehicle.

20 Claims, 7 Drawing Sheets

(56) References Cited

U.S. PATENT DOCUMENTS

| | | | | |
|---|---|---|---|---|
| 3,986,242 A | * | 10/1976 | Kerr | B25B 27/023 29/261 |
| 4,283,827 A | * | 8/1981 | Abel | B23P 19/025 29/254 |
| 4,409,731 A | * | 10/1983 | Campbell | B23P 11/025 29/426.1 |
| 4,492,014 A | * | 1/1985 | Alexander | B25B 27/023 29/259 |
| 4,502,197 A | * | 3/1985 | Harder | B25B 27/0028 29/259 |
| 4,562,631 A | * | 1/1986 | Welch | B25B 27/023 29/259 |
| 6,012,211 A | * | 1/2000 | Ochoa | B25B 27/02 29/244 |
| 6,237,206 B1 | * | 5/2001 | Bezemer | B60B 29/002 29/273 |
| 6,305,061 B1 | * | 10/2001 | King | B25B 27/023 29/259 |
| 6,502,293 B1 | * | 1/2003 | Khurana | B25B 27/02 29/260 |
| 2003/0037425 A1 | * | 2/2003 | Sawaya | B25B 27/023 29/426.5 |
| 2005/0086785 A1 | * | 4/2005 | Young | B25B 11/02 29/426.5 |
| 2015/0143692 A1 | | 5/2015 | James | |
| 2016/0318339 A1 | * | 11/2016 | Liukas | B25B 27/023 |

\* cited by examiner

WHEEL REMOVAL DEVICES

BACKGROUND OF THE INVENTION

1. Technical Field

The present invention relates to devices for use when removing wheels from a motor vehicle, and more particularly to devices for removing a wheel from a truck.

2. Related Art

It is often necessary to remove wheels from trucks during repair or maintenance. For example, wheels routinely are removed to change a tire or to gain access to the brakes that are located behind the wheels. Unfortunately, the wheel removal process can be difficult for a variety of reasons.

First, the wheels, and the inner wheel in particular, fit tightly onto the wheel hub that sits on the end of the axle. Because the tolerance between the circumference of the wheel rim and the wheel hub is very small and the weight of the truck is supported by the wheel hub, wheels have a tendency to become stuck or seized on the hub. This may occur for any type of wheel, including inner wheels, outer wheels, stud-piloted wheels, hub-mounted wheels and the like.

During a typical wheel removal process, the mechanic will remove the lug nuts securing the wheel to the truck (usually with an impact wrench) and remove the wheel by hand. Once seized to the hub, wheels are very difficult—if not impossible—to remove by hand. Instead, mechanics typically bang on the stuck wheel with a sledgehammer until the wheel comes loose. This process is problematic for several reasons. There is little space between the inner and outer wheels and between the wheels and the other components of the truck. Because of these limitations and because the mechanic may need to swing the sledgehammer at awkward angles, the risk of injury to the mechanic is ever present. Damage to the wheel or other parts of the truck also is a concern, especially for aluminum rimmed tires. In addition, it often takes many swings to dislodge a seized wheel—each swing poses an independent risk to the mechanic, the wheel and the rest of the truck.

Furthermore, this method for removing the seized wheel is frequently unsuccessful, even after an extended period of hammering on the seized wheel. In such a case, it is necessary to remove from the axle the wheel hub and wheel together, and then attempt to separate the hub and wheel when the wheel is off of the truck. This creates significant extra work for the mechanic, who must subsequently replace the hub on the axle.

While there are a number of devices which can be used to pull wheels or other devices from an axle, they suffer from various problems. For example, most devices use the hub itself for leverage and push off the hub. However, hub shapes are not universal, making it difficult to use these devices on all wheels. Moreover, the forces generated during the removal process can damage the hub. Other devices use hydraulic mechanisms to remove the wheel. Because these forces can be substantial, the wheel and removal device itself may literally be shot across the garage, posing an even greater risk of injury to the mechanic, the wheel, and the truck than the sledgehammer.

Accordingly, a need has long existed for improved devices and methods for removing a wheel.

SUMMARY

Improved wheel removal tools may include a frame, one or more removal members movably coupled to the frame and one or more connection members coupled to a respective removal member. In operation, the frame may be attached to the wheel, such as at one or more wheel studs or bolts, and the connection members may be attached to the wheel, such as by engaging apertures in the wheel. The base may be configured to leverage the wheel studs—rather than the axle hub—during the wheel removal process. Once engaged with the wheel, the removal members may be moved away from the wheel by an operator so that the connection members pull the wheel to dislodge the seized wheel from the vehicle.

Other systems, methods, features and technical advantages of the invention will be, or will become apparent to one with skill in the art, upon examination of the figures and detailed description. It is intended that all such additional systems, methods, features and technical advantages be included within this summary and be protected by the claims.

BRIEF DESCRIPTION OF THE DRAWINGS

The invention can be better understood with reference to the following drawings and description. The components in the figures are not necessarily to scale, emphasis instead being placed upon illustrating the principles of the invention.

DETAILED DESCRIPTION OF THE PREFERRED EMBODIMENTS

The elements illustrated in the figures interoperate as explained in more detail below. Before setting forth the detailed explanation, however, it is noted that all of the discussion below, regardless of the particular implementation being described, is exemplary in nature, rather than limiting.

1.0 Wheel Removal Tool Overview

Figure 1:
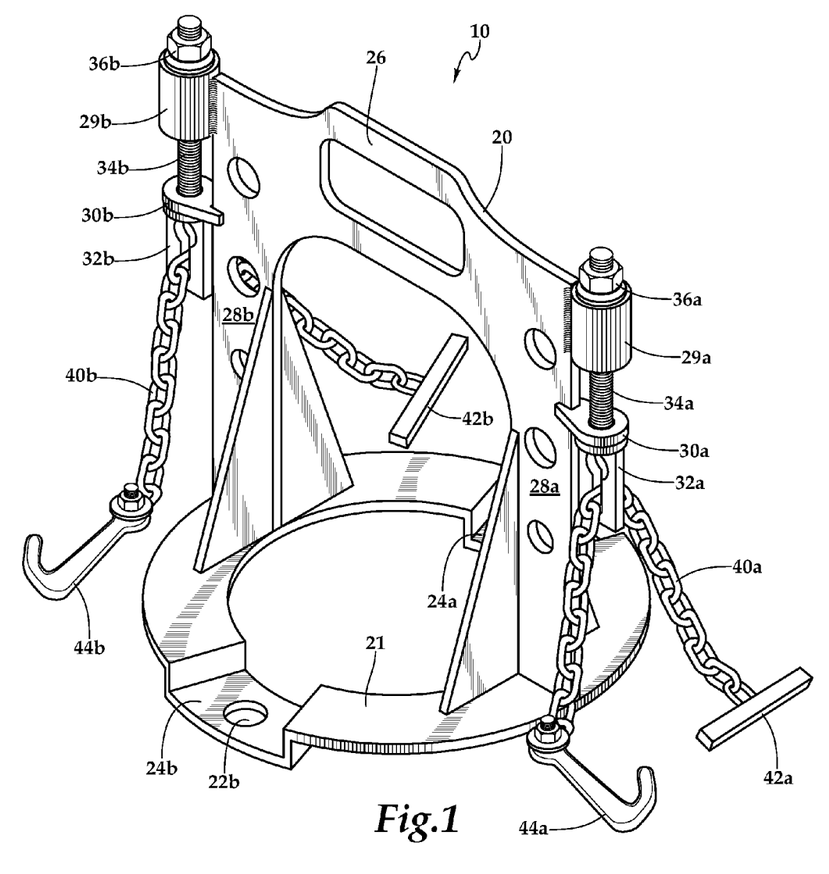
FIG. 1 shows a perspective view of an exemplary wheel removal tool.

Referring to the drawings, and initially to FIG. 1, a perspective view of an exemplary wheel removal tool 10 is shown. In the illustrated embodiment, the wheel removal tool 10 may include a frame 20, one or more removal members 30a and 30b movably coupled to the frame and one or more connection members 40a and 40b coupled to a respective removal member 30a and 30b. In operation, the frame 20 may be attached to the wheel, such as at one or more wheel studs or bolts, and the connection members 40a and 40b may be attached to the wheel, such as by engaging apertures in the wheel. Once engaged with the wheel, the removal members 30*a* and 30*b* may be moved by an operator so that the connection members 42*a* and 42*b* pull the wheel to dislodge the seized wheel from the vehicle.

The various components of the wheel removal tool 10 may be made of any suitably hard material, such as metals like iron, steel or the like. Other materials also may be used. In some embodiments, each component is made of the same material. Alternatively or additionally, one or more of the components of the wheel removal tool 10 may be made of different material than others of the components.

2.0 Exemplary Frames 20

Figure 2:
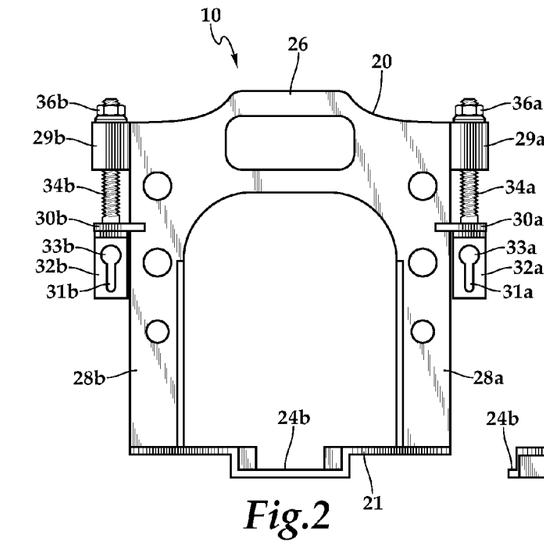
FIG. 2 shows a front view of the exemplary wheel removal tool of FIG. 1.
Figure 3:
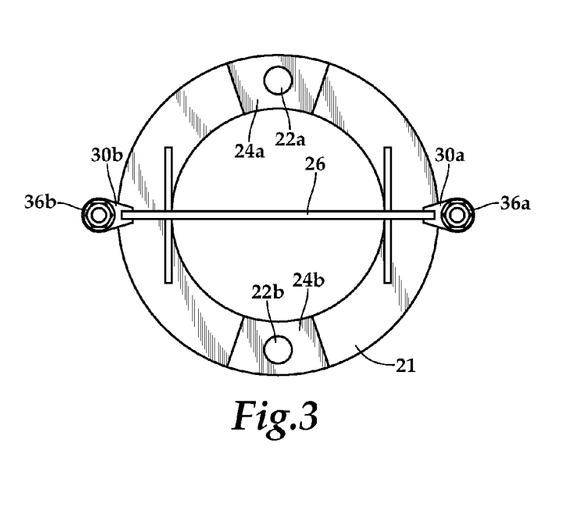
FIG. 3 shows a top view of the exemplary wheel removal tool of FIG. 1.

Referring also to FIGS. 2 and 3, side and top views of the exemplary wheel removal tool of FIG. 1 are shown. The frame 20 may include a base 21, one or more support arms 28*a* and 28*b* coupled to the base 21, a handle 26, and one or more collars 29*a* and 29*b*. The handle 26 may coupled to the support arms 28*a* and 28*b* at an end distal the base and may be dimensioned for receiving a mechanic's hand to grip and/or move the device 10. For example, the handle may be between about 4 inches and about 8 inches long, preferably between about 5 inches and about 7 inches long, and even more preferably about 6 inches long. Other sizes also may be used.

2.1 Exemplary Frame Bases 21

In some embodiments, the base 21 may be substantially ring shaped and include an inner diameter adapted to fit around the hub of a vehicle wheel. For example, the inner diameter of the base 21 may be between about 1/16 of an inch and about 1 and 1/2 inches larger than the wheel hub diameter, preferably between about 1/8 of an inch and about 3/4 of an inch larger than the wheel hub diameter, and even more preferably between about 1/4 of an inch and about 1/2 of an inch larger than the wheel hub diameter. Other shapes and sizes also may be used.

By fitting around the wheel hub, the wheel removal device 10 is able to reduce and/or eliminate problems caused by variations in wheel hubs. In addition, the wheel removal device 10 also is able to reduce and/or eliminate damage to the wheel hub that may be caused by devices that push off or otherwise leverage the wheel hub to generate a force to remove a seized wheel. In turn, the unique design of the wheel removal device 10 also may improve the useful life of the wheel hub.

The outer diameter of the base 21 may be dimensioned to fit within the wheel frame. For example, the outer diameter of the base 21 may be between about 11 inches and about 16 inches, preferably between about 12 inches and about 15 inches, even more preferably between about 13 inches and about 14 inches. In one embodiment, the outer diameter of the base is about 13 and 7/8 inches. Other shapes and sizes also may be used.

2.2 Exemplary Recessed Portions 24*a* and 24*b* and Apertures 22*a* and 22*b*

The base 21 also may include one or more recessed portions 24*a* and 24*b* that include apertures 22*a* and 22*b* for receiving bolts from a wheel to be removed. The recessed portions 24*a* and 24*b* and the apertures 22*a* and 22*b* may be positioned so as to receive at least two studs from the wheel to be removed, such as on opposite sides of the base 21 for receiving studs from a wheel having an even number of studs. Alternatively, or additionally, the recessed portions 24*a* and 24*b* and apertures 22*a* and 22*b* may be positioned to receive studs from a wheel having an odd number of studs. In some embodiments, one or more of the recessed portions 24*a* and 24*b* may include multiple apertures 22*a* and 22*b* for receiving studs from wheels having either an odd or even number of studs. The apertures 22*a* and 22*b* may be dimensioned for receiving studs from the wheel. For example, the apertures 22*a* and 22*b* may have diameters of between about 1 inch and about 1 and 1/2 inches and preferably about 1 and 1/4 inches. Other sizes also may be used.

The recessed portions 24*a* and 24*b* may be recessed between about 7/8 of an inch and about 1 and 1/8 inches from the rest of the base 21, preferably between about 15/16 of an inch and about 1 and 1/16 inches from the rest of base 21 and even more preferably about 1 inch from the rest of the base 21. Other depths also may be used.

In operation, the base may be positioned on the wheel so that studs or bolts protrude through the apertures 22*a* and 22*b* and the mechanic may secure lug nuts to the bolts (such as by hand or other methods) to secure the device 10 in position. As forces are exerted on the wheel via the one or more removal members 30*a* and 30*b*, the underside of the base 21 pushes off the uncapped bolts instead of the hub. In this manner, the wheel removal device 10 is able to reduce and/or eliminate damage to the wheel hub and other problems caused by variations in wheel hubs. In addition, the wheel removal device 10 also is able to distribute the removal forces across the bolts, reducing and/or eliminating the possibility of damage to any individual bolt. Moreover, because bolts are less costly and easier to replace than a wheel hub, the unique design of the wheel removal device 10 also may decrease maintenance costs.

2.2 Exemplary Support Arms 28*a* and 28*b*

The support arms 28*a* and 28*b* may be coupled to base 21 and the one or more collars 29*a* and 29*b*, such as, for example, by a welded connection. Alternatively, or additionally, some or all of the base 21, the handle 26, the one or more support arms 28*a* and 28*b* and the one or more collars 29*a* and 29*b* may be cast as a single unit. The support arms 28*a* and 28*b* may operate to space the collars 29*a* and 29*b* away from the base 21 to increase the accessibility of the nuts 36*a*. In some embodiments and as shown in the illustrated embodiments, the support arms 28*a* and 28*b* may include apertures to reduce the weight of the device 10.

The support arms 28*a* and 28*b* may extend outward from the base 21 between about 6 and 1/2 inches and about 30 inches, preferably between about 10 inches and about 20 inches from the rest of base 21 and even more preferably about 15 inches and about 20 inches from the rest of the base 21. In one embodiment, the support arms 28*a* and 28*b* extend about 17 and 1/4 inches from the base 21. Other sizes also may be used.

2.2 Exemplary Collars 29*a* and 29*b*

The one or more collars 29*a* and 29*b* may be coupled to the main support arms 28*a* and 28*b*. The one or more collars 29*a* and 29*b* each may be substantially hollow cylinders and may receive a respective removal member 30*a* and 30*b*. As such, the collars 29*a* and 29*b* may provide a path through which the removal member may pass. The collars 29*a* and 29*b* may be sufficiently long to provide a stable support for the removal member(s) 30*a* and 30*b*. For example, the collars may be between about 1/2 of an inch and about 1 and 1/2 inches long, preferably between about 3/4 of an inch and about 1 and 1/4 inches long, and even more preferably about 1 inch long.

In some embodiments, the frame 20 may include one or more extension arms attached to the support arms 28*a* and 28*b* and the one or more collars 29*a* and 29*b* so that the collars 29*a* and 29*b* may be positioned further radially outward from the rest of the frame 20.

3.0 Exemplary Removal Members 30a and 30b

Figure 4A:
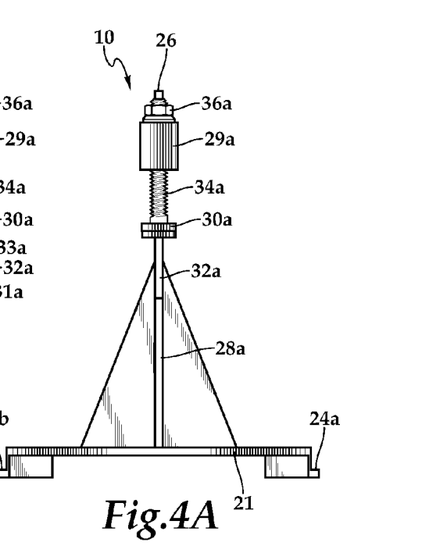
FIG. 4A shows a side view of the exemplary wheel removal tool of FIG. 1.
Figure 4B:
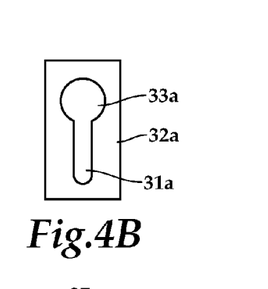
FIG. 4B shows a front view of a first portion of an exemplary removal member of the exemplary wheel removal tool of FIG. 1.
Figure 4C:
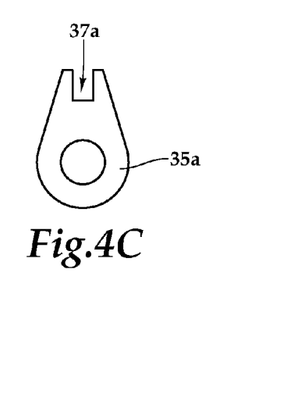
FIG. 4C shows a top view of a second portion of an exemplary removal member of the exemplary wheel removal tool of FIG. 1.

FIGS. 4A-4C show a side view of the exemplary wheel removal tool 10 of FIG. 1, a front view of a first portion of an exemplary removal member 30a of the exemplary wheel removal tool 10 of FIG. 1, and a top view of a second portion of an exemplary removal member 30a of the exemplary wheel removal tool of FIG. 1, respectively. Each removal member 30a may include a threaded shaft 34a, a guide 35a, a lower portion 32a and a nut 36a. The threaded shaft 34a may be provided through the collar 29a and coupled to collar 29a by the nut 36a. Preferably, the nut 36a is open to each side so that, as the nut 36a is rotated, the threaded shaft 34a is moved either closer to or further from the base 21. In one embodiment, this functionality is assisted by the guide 35a, which may engage the support arm 28a to prevent the threaded shaft from freely rotating inside the collar 29a. In the illustrated embodiment, the guide 35a (FIG. 4C) includes a notch 37a that engages the support arm 28a when the threaded shaft 34a is rotated to prevent further rotation of the threaded shaft 34.

The removal member 30a also may include a lower portion 32a having a keyhole aperture including a narrow portion 31a and a wide portion 33a. Referring also to FIG. 1, a chain 41a from the connection member 40a may be disposed in the keyhole aperture of the removal member 30a. In operation, a mechanic or operator may adjust the length of the chain 41a by moving it through the wide portion 33a. Once a desired length of chain 41a is obtained, the mechanic may slide the link into the narrow portion 31a to secure it in place. Other mechanisms to adjust the length of the connection member 40a also may be used.

Removal member 30b may operate similarly.

4.0 Exemplary Wheel Connection Members 40a and 40b

Referring again to FIG. 1, the wheel connection members 40a and 40b each may include a chain 41a and 41b and one or more wheel coupling members 42a, 44a, 42b, and 44b. Multiple wheel coupling members 42a, 44a, 42b, and 44b may be provided to couple the device 10 to different types of wheels. For example, in the illustrated embodiment, the wheel coupling members comprise aluminum hooks 44a and 44b and steel blocks 42a and 42b for coupling the device to aluminum wheels and steel wheels, respectively. Other materials also may be used. In order to engage the aperture of a wheel, the coupling members 42a, 44a, 42b, and 44b may be between about 1 inch and about 8 inches long and preferably between about 1 and ¾ inches and about 6 and ¾ inches long. Other sizes and shapes may be used.

5.0 Exemplary Method for Removing A Wheel

Figure 5:
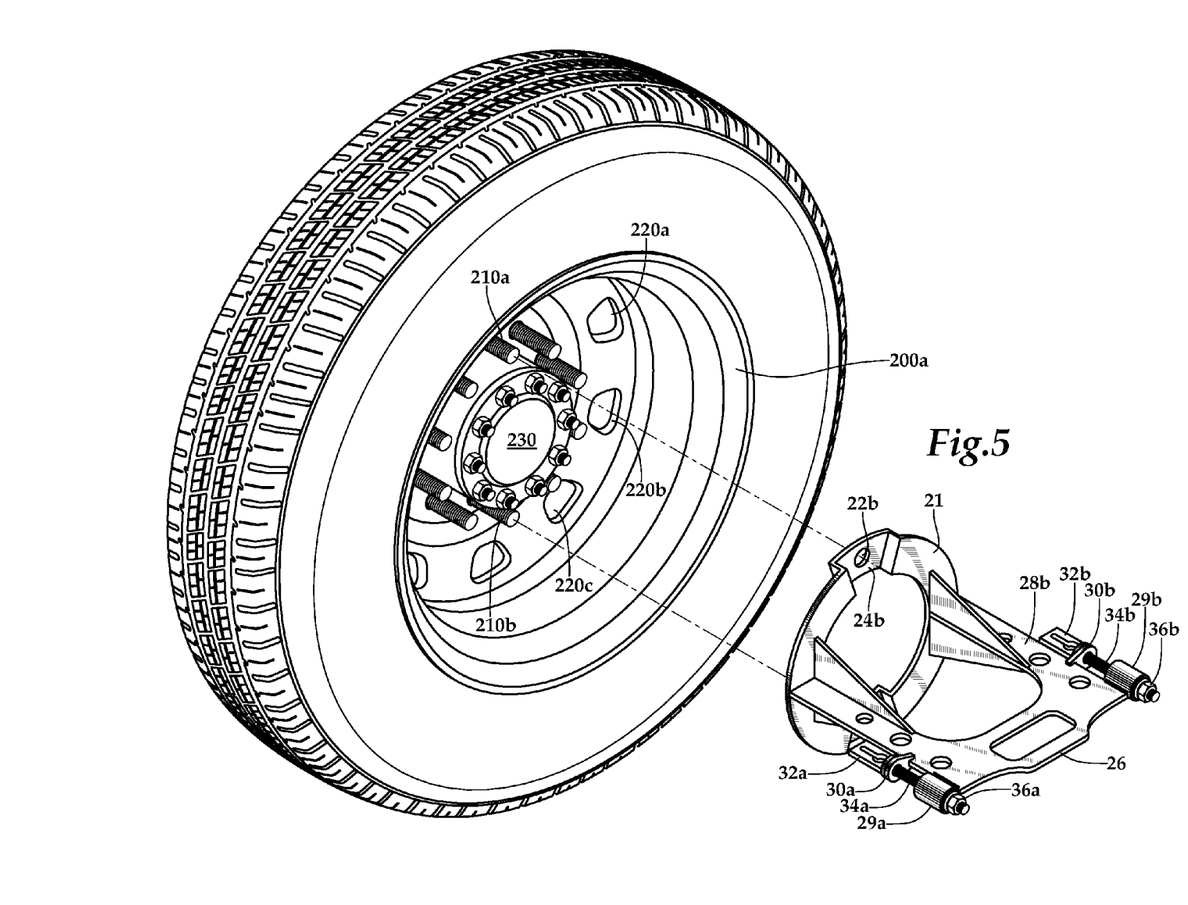
FIG. 5 shows a perspective view of an exemplary wheel and the exemplary wheel removal tool of FIG. 1.
Figure 6A:
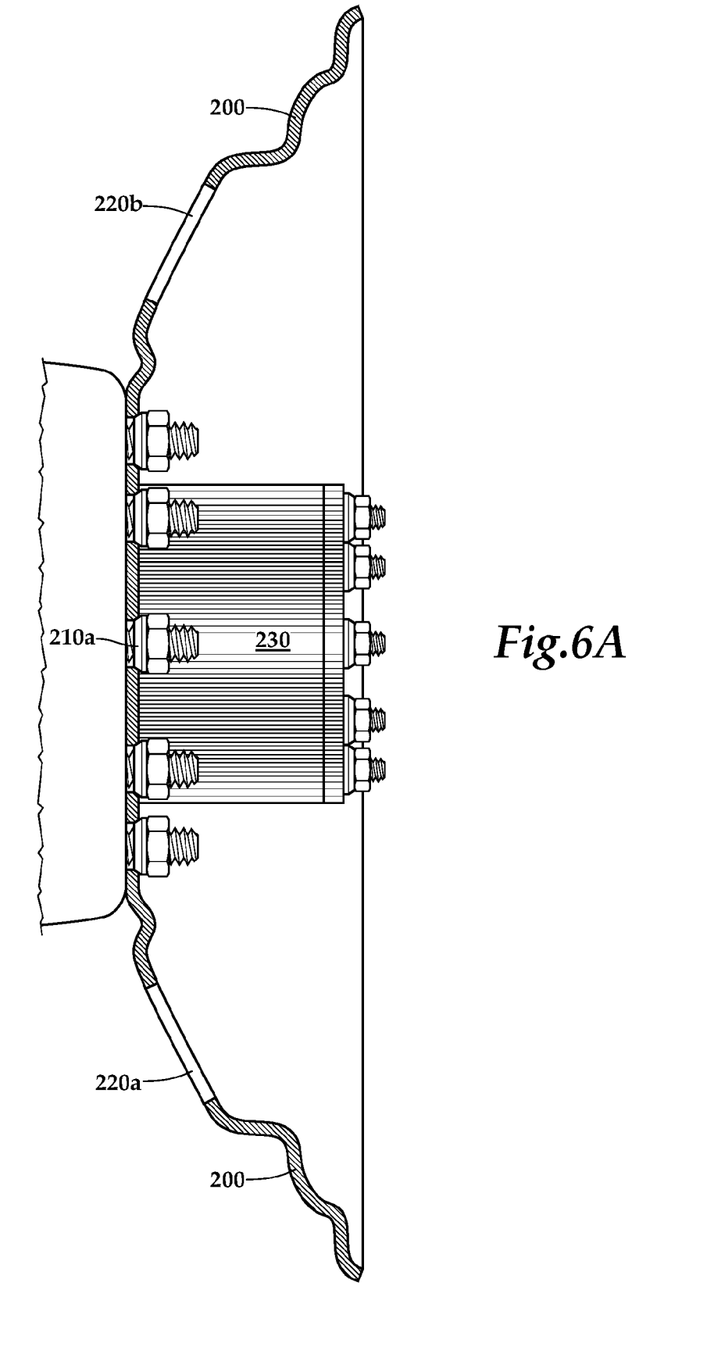
FIGS. 6A-6D show side cutaway views of an exemplary wheel and side views of the exemplary wheel removal tool of FIG. 1 during various stages of an exemplary wheel removal process.
Figure 6B:
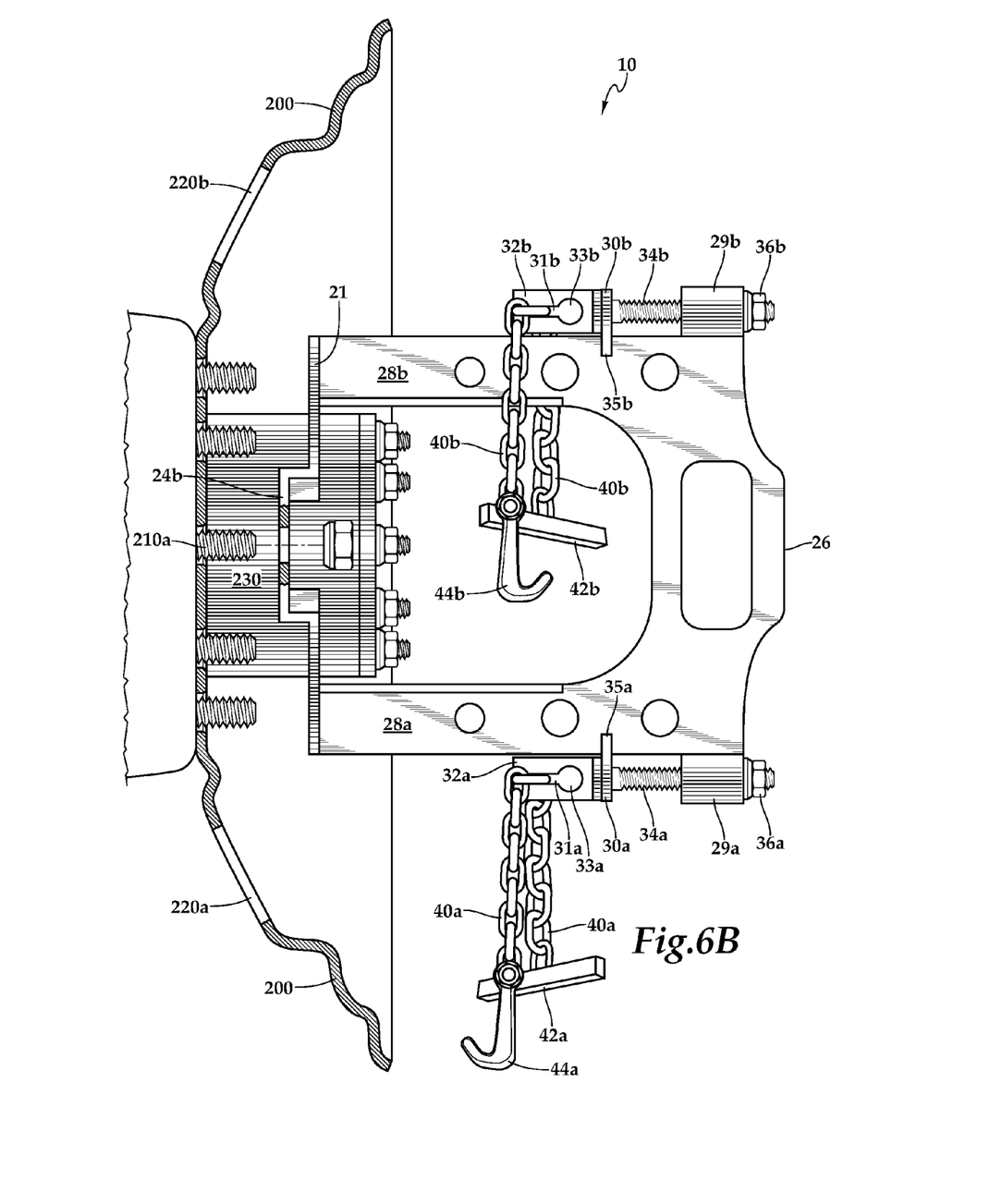
Figure 6C:
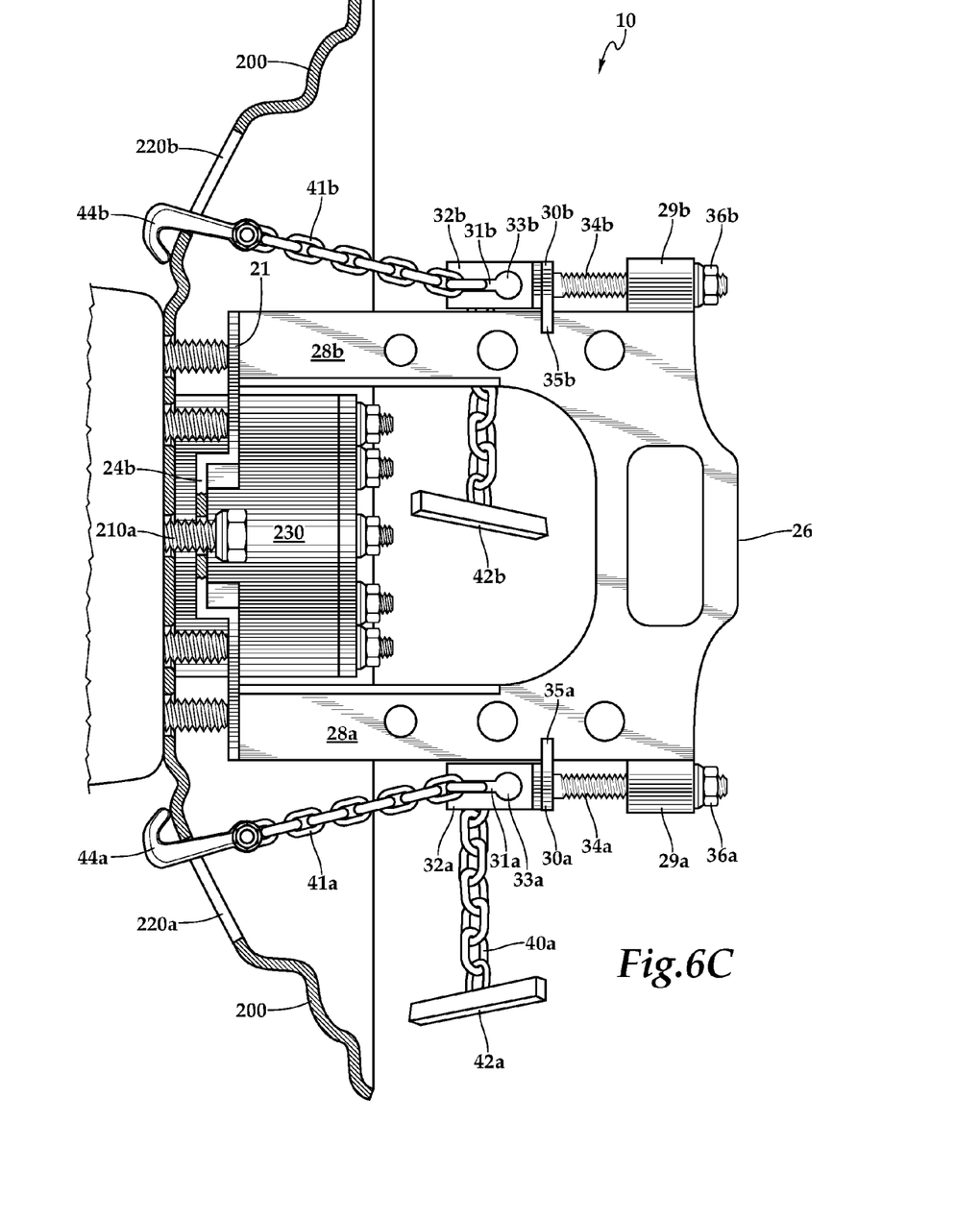

Referring to FIGS. 5 and 6A-6D a perspective and various side views of an exemplary wheel and the exemplary wheel removal tool of FIG. 1 during various stages of an exemplary wheel removal process are shown, respectively. To remove a seized wheel 200 from an axel hub 230, an operator may first remove the lug nuts from the bolts/studs (210a, 210b, etc.) of the wheel, which are shown attached to the wheel studs 210a in FIG. 6A. Next, the operator may position the device such that the apertures 22a and 22b of the recessed portions of the base 21 are aligned with two bolts, such as bolts 210a and 210b as shown in FIGS. 5 and 6B. As shown in FIG. 6B, the base 21 fits around the hub 230, reducing and/or eliminating any problems caused by variations in wheel hubs 230 and reducing and/or eliminating any possibility of damaging the hub 230 during wheel 200 removal. Once aligned, the operator may reattached the lug nuts to the bolts (such as bolt 210a and 210b) exposed through apertures 22a and 22b to secure the device 10 to the seized wheel, as shown in FIG. 6C.

Next, the removal members 30a and 30b may be attached to the wheel by the operator, as shown in FIG. 6C. In the illustrated embodiment, the hooks 44a and 44b of the connection members 40a and 40b are coupled to the wheel 200 through wheel apertures 220a and 220b, respectively. Then, the operator may slide the appropriate links of chains 41a and 41b into the narrow portions of the keyhole apertures 31a and 31b of the lower portion 32a and 32b of the removal member 30 so that the chain is somewhat taught. Once both removal members 30a and 30b are coupled to the wheel 200, the operator may turn the nuts 36a and 36b to cause the removal members 30a and 30b to move away from the base, thereby pulling the wheel 200 to dislodge it from the axle hub 230.

Figure 6D:
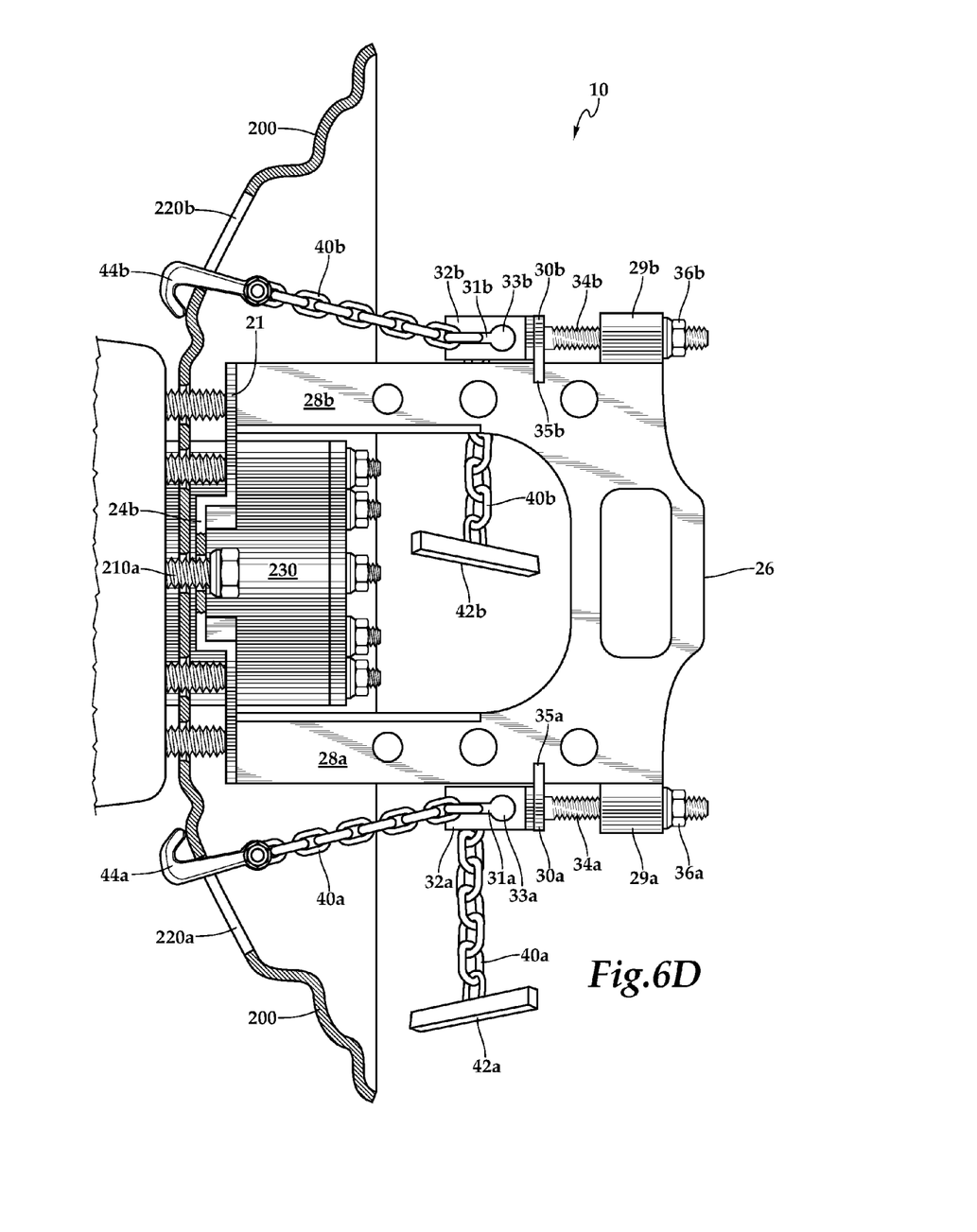

The nuts 36a and 36b may be turned by hand, or a tool such as an impact wrench may be used to apply larger forces to the nuts 36a and 36b. Because the tool 10 is secured to the studs, it operates as a backstop that prevents the wheel 200 from flying off the hub, even when significant forces are applied to dislodge the wheel. Finally, after the wheel 200 has been dislodged from the hub 230, the operator may decouple the connection members 40a and 40b from the wheel and remove any lug nuts from the wheel bolts 210a to decouple the device 10 from the wheel 200.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

I claim:

1. A wheel removal device for removing a seized wheel from a wheel hub and a plurality of wheel studs, the wheel removal device comprising:
   a base having an underside and two recessed portions, each recessed portion including an aperture for receiving at least one of the plurality of wheel studs;
   one or more support arms coupled to the base;
   one or more collars, each coupled to the one or more support arms, the one or more collars each comprising a hollow cylinder; and
   one or more removal members, each movably coupled to a respective one of the one or more collars, the one or more removal members each including a threaded shaft provided through its respective collar, a nut coupled to the threaded shaft at an end distal the base, and a connection member for coupling the removal member to the wheel and exerting a force on the wheel;
   where the underside of the base is adapted to push against one or more of the plurality of wheel studs when a force is exerted on the wheel by the connection member.

2. The wheel removal device of claim 1, where the base is a substantially ring-shaped base.

3. The wheel removal device of claim 2, where the substantially ring-shaped base has an inner diameter between about ⅛ of an inch and about ¾ of an inch larger than a diameter of the wheel hub.

4. The wheel removal device of claim 1, further comprising a handle coupled to the one or more support arms.

5. The wheel removal device of claim 1, where each of the one or more removal members further includes a guide that engages a respective one of the one or more support arms to stop the removal member from freely rotating within its respective collar of the one or more collars.

6. The wheel removal device of claim 5, where rotation of each of the one or more nuts causes each nut's respective removal member to move away from the base.

7. The wheel removal device of claim 6, where each of the one or more guides comprises a notch.

8. The wheel removal device of claim 1, where at least one of the connection members of the one or more removal members includes a linked chain coupled to either a hook, a bar, or both.

9. The wheel removal device of claim 8, where at least one of the one or more removal members includes a key-hole shaped aperture for the linked chain of its respective connection member.

10. The wheel removal device of claim 1, where the recessed portions are recessed from the rest of the base by at least ¼ of an inch.

11. A wheel removal device for removing a seized wheel from a wheel hub and a plurality of wheel studs, the wheel removal device comprising:
   a substantially ring-shaped base having an underside and two recessed portions, each recessed portion including an aperture for receiving at least one of the plurality of wheel studs;
   two support arms coupled to the base;
   a handle coupled to each of the support arms at an end distal the base;
   two collars, each coupled to a respective one of the support arms, each of the collars comprising a hollow cylinder; and
   two removal members, each movably coupled to a respective one of the collars, each removal member including a threaded shaft provided through its respective collar, a nut coupled to the threaded shaft at an end distal the base, and a connection member for coupling the removal member to the wheel and exerting a force on the wheel;
   where the underside of the base is adapted to push against one or more of the plurality of wheel studs when a force is exerted on the wheel by the connection member.

12. The wheel removal device of claim 11, where the substantially ring-shaped base has an inner diameter between about ⅛ of an inch and about ¾ of an inch larger than a diameter of the wheel hub.

13. The wheel removal device of claim 11, where each of the two removal members further includes a guide that engages a respective one of the two support arms, the guide comprising a notch.

14. The wheel removal device of claim 13, where rotation of each nut causes each nut's respective removal member to move away from the base.

15. The wheel removal device of claim 11, where at least one of the connection members includes a linked chain coupled to either a hook, a bar, or both.

16. The wheel removal device of claim 15, where at least one of the two removal members includes a key-hole shaped aperture for the linked chain of at least one of the connection members.

17. The wheel removal device of claim 11, where the recessed portions are recessed from the rest of the base by at least ¼ of an inch.

18. A wheel removal device for removing a seized wheel from a wheel hub and a plurality of wheel studs, the wheel removal device comprising:
   a substantially ring-shaped base having an underside and two recessed portions, each recessed portion including an aperture for receiving at least one of the plurality of wheel studs, the substantially ring-shaped base having an inner diameter between about ⅛ of an inch and about ¾ of an inch larger than a diameter of the wheel hub;
   two support arms coupled to the base;
   a handle coupled to each of the support arms at an end distal the base;
   two threaded collars, each coupled to a respective one of the support arms, each threaded collar comprising a hollow cylinder having a threaded inner-surface;
   two removal members, each movably coupled to a respective one of the threaded collars, each removal member including a threaded shaft for engaging the threaded inner-surface of the threaded collar and a connection member for coupling the removal member to the wheel and exerting a force on the wheel, each connection member including a linked chain coupled to either a hook, a bar, or both; and
   two nuts, each coupled to the threaded shaft of a respective removal member, where rotation of the nut causes the respective removal member to move away from the base;
   where the underside of the base is adapted to push against one or more of the plurality of wheel studs when a force is exerted on the wheel by the connection member.

19. The wheel removal device of claim 18, where at least one removal member includes a key-hole shaped aperture for the linked chain of the connection member.

20. The wheel removal device of claim 18, where the recessed portions are recessed from the rest of the base by at least ¼ of an inch.

* * * * *

UNITED STATES PATENT AND TRADEMARK OFFICE
CERTIFICATE OF CORRECTION

PATENT NO. : 9,969,214 B1
APPLICATION NO. : 15/657692
DATED : May 15, 2018
INVENTOR(S) : James Gesto

Page 1 of 1

It is certified that error appears in the above-identified patent and that said Letters Patent is hereby corrected as shown below:

On the Title Page

Item (73) Assignee field incorrectly reads:
"Pro-Tate Systems, Inc., South Bend, IN (US)"
And should be corrected to read:
--Pro-Tote Systems, Inc., South Bend, IN (US)--.

Signed and Sealed this
Tenth Day of July, 2018

Andrei Iancu
*Director of the United States Patent and Trademark Office*